Patented June 29, 1937

2,085,391

UNITED STATES PATENT OFFICE 2,085,391

LYOPHILIC BIOLOGICALLY ACTIVE SUBSTANCES AND PROCESS OF PRODUCING THE SAME

John Reichel, Philadelphia, Pa., assignor to Sharp & Dohme, Incorporated, Philadelphia, Pa., a corporation of Maryland No Drawing. Application January 31, 1934, Serial No. 709,190

4 Claims. (Cl. 167—78)

This invention relates to improvements in lyophilic biologically active substances and methods of producing them and is an improvement upon the invention of my prior application, Serial No. 706,547, filed January 13, 1934, now Patent No. 2,066,302, patented December 29, 1936. The invention relates more particularly to such lyophilic products when produced in final containers from a concentrated liquid state such that more of the material may be produced in the containers than would be possible if the original unconcentrated liquid material were processed therein. It includes both the new products and processes of producing them.

According to the invention of said prior application, biologically active substances are converted into a new lyophilic biologically active form by rapid freezing of the fresh substance, such as sera, etc., and removal of water from the frozen product by subliming or vaporizing the ice therefrom under a high vacuum while maintaining the substance in a solid frozen condition.

The new lyophilic product, properly prepared and protected, can be kept in a lyophilic state for prolonged periods of time, for example, by sealing them in evacuated containers. The containers may vary in size from a small ampule or container of around one cubic centimeter or smaller capacity to a large flask or container of as much as fifty litres capacity or greater.

The present invention makes possible the marketing of the lyophilic product with a greatly increased content of the product in individual containers. It is an important advantage of the present invention that the restoring of the solid lyophilic product to a liquid state can be accomplished with much less water than was originally present in the serum or other liquid product, thereby obtaining a concentrated liquid product, of which a much larger amount can be put in an individual container, and, when again subjected to the process of said prior application, there will be obtained in the container far more of the solid lyophilic product than could be produced in said container initially from the initial serum or other material. By using a concentrated restored liquid in this way, the containers may be smaller in capacity, or, for a container of a given size, a greatly increased amount of the material can be provided therein. For example, in a container of 50 cc. capacity, about 25 cc. of material may be inserted in a liquid state, and if the liquid is three times as concentrated as the original serum, there will be contained in the container, after the concentrated restored liquid material has been again relyophilized, the equivalent of about 75 cc. of original serum.

Biological products which are used in the diagnosis, prevention and treatment of diseases, usually require accurate dosage and each lot may require to be standardized and tested for potency. When the lyophilic substance of my said prior application is initially prepared in an ampule or unit container from a standardized batch, the proper amount of liquid product can be accurately measured at the time the individual container is filled, and the lyophilic product can be preserved in this container, in an evacuated state until used, and then used by the addition of water thereto.

When, however, the lyophilic material is produced in bulk, it does not readily lend itself to accurate subdivision and measurement by weight or volume. In order to transfer the lyophilic material from the bulk container to the final individual containers, the bulk lyophilic material must be reduced to a powder by rubbing and straining and then subdivided into individual quantities by weight or volume before placing in the final container. This requires handling of the lyophilic material with exposure to air, moisture and possible contamination, and it is difficult to insure accuracy and lack of variation in the individual amounts placed in the final containers.

When the process of the present invention is used, accurate subdivision of the solid lyophilic material is made possible and the objectionable difficulties in subdividing, above mentioned, eliminated.

Another problem which is presented in the preparation and marketing of biologically active substances, such as sera, etc., is that of obtaining uniformity of product. In the case of normal horse serum, for example, the individual bleedings from each horse may be about ten litres, and by combining the bleedings from say eight horses about eighty litres of blood is obtained from which about sixty litres of composite serum is obtained. Such a composite lot of serum can be subjected to the treatment of my said prior application Serial No. 706,547 and converted into a bulk lot of lyophilic product. Fresh serum cannot be kept for any considerable time without treatment to preserve it, and when a sufficient amount of material is not available for producing a composite batch, it may be necessary to subject each lot, or a limited number of lots, to the lyophilizing treatment of said application, to produce lyophilized solid products therefrom.

When the process of the present invention is used, the blending of such products and the accurate subdivision of the blended products is made possible, as is the production of far larger bulk lots of blended products which can be standardized and check tests made without the necessity of standardizing and making check tests on the individual lots.

According to the present invention individual lots of solid lyophilic product, such as produced in accordance with said prior application Serial No. 706,547, may be restored to a liquid condition by the addition of aqueous liquid containing substantially less water than that removed from the original liquid material, accurately measured volumes of the liquid are then segregated, and the liquid is again subjected to the process of said prior application to again convert it into the solid lyophilic state. A bulk lot of the solid lyophilic product can thus be restored to a liquid condition, of a smaller volume than that of the original material, and accurately subdivided and placed in individual containers, and the restored liquid again subjected to the process of said prior application to give a solid lyophilic product. In this way the bulk product originally produced can be accurately subdivided, for example, into individual doses, or into smaller amounts of the same product.

Where different batches of fresh serum or other biologically active liquid products are treated according to the process of said prior application and converted into a solid lyophilic state, and where the individual batches so produced vary somewhat in their properties, a sufficient number of such batches may be accumulated, and preserved in evacuated containers, and then, when desired, a number of these batches may be restored to a liquid condition, by the addition of water, the resulting liquid product blended in proper proportions to form a large bulk of blended material of uniform or average composition, and this entire large batch can then be subjected, either as a whole or in different lots thereof to the treatment of said application to reconvert it into a solid lyophilic state. With a single large batch made by blending individual batches, the standardization of the composite batch, and the making of check tests thereon, gives a much larger amount of material which can be standardized, and check tests made on it, thus making possible a greatly reduced number of check tests for standardization, while at the same time obtaining the advantages of mixing or blending different products, and making a more uniform composite product.

With such a large batch of a composite product, accurate subdivision is possible by measuring the liquid, and individual containers can be filled therewith, and converted into a solid lyophilic state by again subjecting the material to rapid freezing and removal of ice therefrom, according to the process of said prior application.

Where a large amount of bulk material is contained in a large container, it sometimes happens that a part only of this batch is needed, and the remainder is not needed until some future time. Such amount of the restored material as is not needed will, if kept in its restored liquid state, be affected by time, temperature and any preservatives added, much the same as the fresh serum; but by again lyophilizing the unneeded portion of the restored liquid, it can be again converted into a stable lyophilic state and again kept until needed.

It will thus be seen that the present invention presents many advantages. It enables a much more concentrated liquid to be prepared by restoring the solid lyophilic substance with much less water than originally present, and relyophilizing the concentrated liquid to produce a greatly increased amount of solid lyophilic product in a given container than is possible by the original lyophilizing treatment. Excessively large containers for the product are thus avoided; the blending of materials produced originally at different intervals of time is made possible to secure uniformity, and accurate subdivision and dosage is made possible.

The present invention is of more or less general application to biologically active substances such as described in my said prior Patent No. 2,066,302. Sera of various kinds can thus be treated, such as convalescent, homologous, anti-bacterial, anti-toxin and normal sera, etc. and such other substances of bacterial or other origin as have biological activity and which are adversely affected by time, temperature and preservatives.

I claim:

1. The improvement in the production of lyophilic, biologically-active substances from liquid biologically-active substances to obtain in a given container more of such substance than could be formed by initial, complete and direct lyophilization of the original liquid material therein, which comprises initially dehydrating the original liquid material while it is in a solid frozen state by the application of a high vacuum and without melting or softening thereof, then forming from the product of said initial dehydration a concentrated, liquid product containing substantially less water than the original material from which it was formed, and subsequently dehydrating at least a part of said concentrated product in a container insufficient in size to permit the initial dehydration of an equivalent amount of original liquid material necessary to produce the amount of concentrated material in said container, by removing water while it is in a solid frozen state by the application of a high vacuum and without melting or softening thereof until said product is in a lyophilic solid state.

2. The improvement in the production of lyophilic, biologically-active substances from liquid, biologically-active substances to obtain in a given container more of such substance than could be formed by initial, complete and direct lyophilization of the original liquid material therein, which comprises initially dehydrating the original liquid material to a lyophilic, solid state, dissolving the lyophilic, solid product in an amount of aqueous liquid containing materially less water than that removed from the original material to form a restored, liquid, concentrated product, introducing the restored, liquid, concentrated material into a container insufficient in size to permit the initial dehydration of an equivalent amount of original, liquid material necessary to produce the restored, liquid, concentrated material introduced therein, dehydrating the restored, concentrated material in said container until it is in a lyophilic solid state, both the initial and subsequent dehydrations being conducted by removing water from the material while it is in a solid frozen state by the application of a high vacuum and without melting or softening of the material.

3. A biologically-active-substance-containing package comprising a sealed, evacuated container containing biologically-active material lyophilized therein and capable of being restored, by the addition of water thereto, to a biologically-active substance having properties similar to that of the original material from which it was prepared, said material having been produced in the container in an amount substantially greater than could be obtained therein by initial, complete and direct lyophilization of the original liquid material in the container, by removing water from the material while in a solid frozen state by the application of a vacuum and without melting or softening of the material.

4. A biologically-active-substance-containing package comprising a sealed, evacuated container containing biologically-active material lyophilized therein and capable of being restored, by the addition of water thereto, to a biologically-active substance having properties similar to that of the original liquid material from which it was prepared, said material having been produced in the container in an amount substantially greater than could be obtained therein by initial, complete and direct lyophilization of the original liquid material in the container, by removing water from the material while in a solid frozen state by the application of a vacuum and without melting or softening of the material, said material being in a solid state and having substantially the shape and volume of the material before lyophilization.

JOHN REICHEL.